United States Patent
Ju et al.

(10) Patent No.: US 6,614,615 B1
(45) Date of Patent: Sep. 2, 2003

(54) DISK DRIVE WITH ADAPTIVE CONTROL PATH THAT PRODUCES AN ADAPTIVE CONTROL EFFORT BASED ON A CHARACTERIZED DEVIATION BETWEEN ACTUAL AND MODELED PLANT RESPONSE

(75) Inventors: Yie Ju, Irvine, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/539,349

(22) Filed: Mar. 31, 2000

(51) Int. Cl.[7] ............................................... G11B 5/596
(52) U.S. Cl. ..................................................... 360/78.04
(58) Field of Search .............................. 360/78.04, 77.08

(56) References Cited

U.S. PATENT DOCUMENTS

| | | |
|---|---|---|
| 5,369,345 A | 11/1994 | Phan et al. |
| 5,550,685 A | 8/1996 | Drouin |
| 6,013,995 A * | 1/2000 | Kim .............................. 318/561 |

* cited by examiner

*Primary Examiner*—David Hudspeth
*Assistant Examiner*—Mitchell Slavitt
(74) *Attorney, Agent, or Firm*—Milad G. Shara, Esq.; Myers Dawes Andras & Sherman LLP

(57) ABSTRACT

A disk drive with a plant having an actual plant response $G(z)$ and a servo controller that includes a feed-forward control path that operates with a modeled plant response $G_0(z)$ in order to output a feed-forward command effort. The plant includes a transducer that is moveable from a start position to a target position according to a total control effort. In addition to the feed-forward control path, the servo controller further includes a feedback control path that outputs a feedback command effort in response to an error signal e between a desired position and an indicated position, and an adaptive control path that monitors the error signal e during the first several samples of a seek in order to characterize any modeling error between the modeled plant response $G_0(z)$ and the actual plant response $G(z)$ and to thereafter output an adaptive command effort during subsequent samples to compensate for such modeling error and thereby make the error signal e approach zero at the end of the seek or, equally speaking, to make the transducer 80 arrive at the target position at the end of the seek notwithstanding the modeling error.

2 Claims, 13 Drawing Sheets

| Seek Length (tracks) | m (learning duration only in samples) | n (total feed-forward duration in samples, learning and adapting) |
|---|---|---|
| 1-2 | 6 | 6* |
| 3-15 | 7 | 10 |
| 16-35 | 8 | 14 |
| 36-80 | 10 | 20 |
| 81-160 | 11 | 28 |

* In the very short 1-2 track case m=n=6 such that the controller is always learning, but never adapting.

Figure 8

1-2 Track Seeks
m=6, *n=6

| sample i | reference position r | FF1 | FF2 | FF3 | FF4 | $\dfrac{u_{adapt0}[i]}{S_{m0}}$ |
|---|---|---|---|---|---|---|
| 1 | 32767 | 8168 | 11118 | 14628 | 14772 | 0 |
| 2 | 32704 | 13992 | 11438 | 8274 | 4564 | 0 |
| 3 | 27992 | 927 | -2445 | -5260 | -7437 | 0 |
| 4 | 16507 | -8900 | -9695 | -9858 | -9520 | 0 |
| 5 | 6261 | -8736 | -7705 | -6357 | -5120 | 0 |
| ***6 | 1118 | -3354 | -2156 | -1198 | -479 | **0 |

Figure 9

3-15 Track Seeks
m=7, *n=10

| sample i | reference position r | FF1 | FF2 | FF3 | FF4 | $\dfrac{u_{adapt0}[i]}{S_{m0}}$ |
|---|---|---|---|---|---|---|
| 1 | 32767 | 1821 | 2713 | 3910 | 4567 | 0 |
| 2 | 32746 | 5132 | 5346 | 5372 | 5151 | 0 |
| 3 | 31606 | 4759 | 4205 | 3540 | 2793 | 0 |
| 4 | 27577 | 2003 | 1198 | 410 | -332 | 0 |
| 5 | 21453 | -1008 | -1613 | -2138 | -2577 | 0 |
| 6 | 14633 | -2927 | -3187 | -3363 | -3457 | 0 |
| 7 | 8695 | -3476 | -3429 | -3322 | -3165 | **-171 |
| 8 | 4362 | -2965 | -2733 | -2473 | -2198 | -156 |
| 9 | 1836 | -1904 | -1617 | -1306 | -1042 | -122 |
| ***10 | 652 | -692 | -445 | -247 | -99 | -70 |

Figure 12

16-35 Track Seeks
m=8, *n=14

| sample i | reference position r | FF1 | FF2 | FF3 | FF4 | $\dfrac{u_{adapt0}[i]}{S_{m0}}$ |
|---|---|---|---|---|---|---|
| 1 | 32767 | 669 | 1026 | 1522 | 1853 | 0 |
| 2 | 32756 | 2182 | 2412 | 2592 | 2696 | 0 |
| 3 | 32324 | 2741 | 2722 | 2650 | 2525 | 0 |
| 4 | 30569 | 2358 | 2153 | 1917 | 1657 | 0 |
| 5 | 27440 | 1381 | 1094 | 803 | 511 | 0 |
| 6 | 23222 | 225 | -50 | -306 | -546 | 0 |
| 7 | 18416 | -767 | -968 | -1146 | -1303 | 0 |
| 8 | 13671 | -1436 | -1546 | -1633 | -1698 | **-216 |
| 9 | 9409 | -1741 | -1765 | -1769 | -1756 | -214 |
| 10 | 5938 | -1727 | -1684 | -1627 | -1560 | -205 |
| 11 | 3355 | -1482 | -1396 | -1304 | -1206 | -185 |
| 12 | 1703 | -1103 | -999 | -891 | -785 | -152 |
| 13 | 742 | -675 | -572 | -461 | -370 | -110 |
| ***14 | 306 | -249 | -160 | -89 | -36 | -59 |

Figure 13

36-80 Track Seeks
m=10, *n=20

| sample $i$ | reference position $r$ | FF1 | FF2 | FF3 | FF4 | $\dfrac{u_{adapt0}[i]}{S_{m0}}$ |
|---|---|---|---|---|---|---|
| 1 | 32767 | 233 | 364 | 547 | 684 | 0 |
| 2 | 32762 | 826 | 943 | 1052 | 1140 | 0 |
| 3 | 32597 | 1214 | 1272 | 1313 | 1339 | 0 |
| 4 | 31932 | 1349 | 1345 | 1328 | 1296 | 0 |
| 5 | 30631 | 1254 | 1200 | 1137 | 1064 | 0 |
| 6 | 28643 | 986 | 899 | 810 | 714 | 0 |
| 7 | 26041 | 617 | 516 | 416 | 315 | 0 |
| 8 | 22934 | 215 | 116 | 22 | -70 | 0 |
| 9 | 19607 | -156 | -240 | -318 | -392 | 0 |
| 10 | 16233 | -461 | -525 | -583 | -636 | **-127 |
| 11 | 12977 | -683 | -724 | -760 | -791 | -131 |
| 12 | 9959 | -816 | -836 | -851 | -861 | -135 |
| 13 | 7346 | -867 | -867 | -864 | -857 | -137 |
| 14 | 5185 | -846 | -831 | -814 | -793 | -132 |
| 15 | 3461 | -770 | -744 | -716 | -686 | -121 |
| 16 | 2172 | -655 | -622 | -588 | -553 | -105 |
| 17 | 1255 | -518 | -481 | -445 | -408 | -86 |
| 18 | 673 | -371 | -334 | -297 | -261 | -65 |
| 19 | 347 | -225 | -191 | -154 | -125 | -44 |
| ***20 | 189 | -86 | -55 | -31 | -12 | -23 |

Figure 14

DISK DRIVE WITH ADAPTIVE CONTROL PATH THAT PRODUCES AN ADAPTIVE CONTROL EFFORT BASED ON A CHARACTERIZED DEVIATION BETWEEN ACTUAL AND MODELED PLANT RESPONSE

FIELD OF THE INVENTION

The present invention relates generally to magnetic disk drives and, more particularly, to a disk drive with an adaptive control path that produces an adaptive control effort based on a characterized deviation between actual plant frequency response and modeled plant frequency response.

BACKGROUND OF THE INVENTION

Magnetic disk drives generally read and write data on the surface of a rotating magnetic disk with a transducer that is located at the far end of a moveable actuator. A servo control system uses servo control information recorded amongst the data, or on a separate disk, to controllably move the transducer from track to track ("seeking") and to hold the transducer at a desired position ("track following"). A detailed discussion of servo control systems is unnecessary because such systems are well known as set forth, for example, in patent application Ser. No. 09/138,841 that was filed on Aug. 24, 1998, entitled "DISK DRIVE CAPABLE OF AUTONOMOUSLY EVALUATING AND ADAPTING THE FREQUENCY RESPONSE OF ITS SERVO CONTROL SYSTEM," and is commonly owned by the assignee of this application.

Most disk drives have previously been used for storing conventional data files of the type that are associated with personal computers. In such applications, data integrity is paramount relative to other considerations such as seek times and the reduction of acoustic noise. It presently appears, however, that disk drives are likely to become popular for recording and replaying audiovisual data—e.g. a drive based recording device that replaces video cassette recorders (VCRs). A drive-based recording device of this nature will benefit from using a disk drive with faster seek times because it will spend less time moving its actuator where it needs to be and have more time to record or recover information in any given unit of time. The drive-based recording device, therefore, may be able to record and/or playback more audiovisual data streams that otherwise possible. At the same time, the drive-based recording device is likely to be located adjacent to a television or be in some other location where acoustic noise issues arise. Accordingly, it is equally important for the disk drive to implement its seeks in as quiet a manner as possible.

The drive industry has progressed through several stages of development as related to seeks. Of particular relevance here, is the prior use of a so-called "bang-bang" seek profile wherein the transducer is rapidly accelerated at the start of a seek and then rapidly decelerated at the end of a seek using saturated levels of command effort (current or voltage). A bang-bang seek profile moves the transducer to a target position in as rapid a manner as possible. On the other hand, because the bang-bang acceleration profile is a square wave, it is relatively loud and it contains many high frequency components that may detrimentally excite a mechanical resonance that causes the transducer to take longer to settle into the target position. It has previously been determined that a quieter, faster settling seek is possible by "shaping" the transducer's acceleration profile so that it does not appear like a square wave, but rather approximates a single frequency sine wave. The result is a shaped seek profile that is "close" to a bang-bang square wave but is quieter and does not contain the high frequency components that may excite the drive's resonant frequencies.

Modern disk drives generally use a sampled servo control system that only periodically receives position information (e.g. once per servo sector) and shortly thereafter outputs a command effort based on a deviation between the indicated position and the target position. The servo control system in such a drive implements a shaped seek profile as a feed-forward profile using a feed-forward control path as a feed-forward profile using as discussed, for example, in co-pending patent application no. (pending) that was filed on Mar. 31, 2000, entitled "DISK DRIVE WITH FEED-FORWARD CONTROL PATH THAT RECEIVES A REFERENCE POSITION SIGNAL TO APPLY A FEED-FORWARD COMMAND EFFORT AT A RATE GREATER THAN A SERVO SAMPLING RATE," ("the Multi-rate Feed-Forward Application"), which application is commonly owned by the assignee of this application and hereby incorporated by reference in its entirety.

Modeling errors in the feed-forward control path, however, may cause the servo to inaccurately follow the intended feed-forward profile. In the referenced co-pending application, the feed-forward control path does not model the plant at all but rather implements a simple double derivative of the reference position signal to form a sinusoidal seek profile without regard to the frequency-dependent variance of the plant. The benefits of the multi-rate feed-forward path in the foregoing application, moreover, diminishes with the number of servo samples such that it only provides a practical benefit for short to medium seeks.

The most prevalent modeling errors are gain errors due to variation in the values of the motor torque constant ($K_T$) and the motor winding resistance ($R_W$) due to changes in temperature, calibration errors, track pitch errors, and other factors. These modeling errors may cause the actuator to either overshoot or undershoot the target position at the end of the shaped seek, and thereby increase the required settling time for seeks of all lengths.

One could simply rely on the feedback loop that contains the feedback control path to repeatedly, reactively reign in any deviation caused by the feed-forward control path's modeling error in a sample by sample fashion (as in the above-referenced Multi-rate Feed-forward application), but system performance would be improved if the effect of the modeling error could be eliminated or reduced.

There remains a need, therefore, for a disk drive with a servo controller which provides improved performance by reducing or eliminating variance due to modeling error in a feed-forward control path.

SUMMARY OF THE INVENTION

The invention may be regarded as a disk drive comprising a plant and a servo controller with an adaptive control path that produces an adaptive control effort based on a characterized deviation between an actual plant frequency response (G) and a modeled plant frequency response ($G_0$). The plant has an actual frequency response (G) and the servo controller includes a feed-forward control path that operates according to a modeled frequency response ($G_0$) of the plant. The plant more specifically comprises a transducer that repetitively samples position information during sample periods to produce a signal representing an indicated position (y), and a voice coil motor (VCM) adapted for positioning the transducer in response to a total command effort signal (u), The servo controller generates the total command effort signal (u) for moving the transducer from a start position to a target position. The servo controller comprises (a) a reference position generator that produces a reference position signal (r) that varies as a function of time and represents a shaped position profile to be followed by the transducer as it moves from the start position to the target position; (b) a feed-forward control path that operates according to a modeled frequency response ($G_O$) of the plant, the feed-forward control path receiving the reference position signal (r) and producing a feed-forward command effort signal ($u_{ffwd}$) that corresponds to moving the transducer along the shaped position profile when the actual frequency response (G) is equal to the modeled frequency response ($G_O$); (c) a feedback control path including a difference junction that differences the reference position signal (r) and the indicated position signal (y) to produce an error signal (e) when the transducer does not move along the shaped position profile due to a deviation between the actual frequency response (G) and the modeled frequency response ($G_O$), the feedback loop producing a feedback command effort signal ($u_{fb}$) based on the error signal (e); (d) an adaptive control path that (i) receives the error signal (e) over a plurality of initial sample periods to characterize the deviation between the actual frequency response (G) and the modeled frequency response ($G_O$), (ii) and then produces an adaptive command effort signal ($u_{adapt}$) based on the characterized deviation to cause the transducer to more closely follows the shaped position profile as it continues to the target position; and (e) a summing junction that combines the feed-forward command effort signal ($u_{ffwd}$), the feedback command effort signal ($u_{fb}$), and the adaptive command effort signal ($u_{adapt}$) to produce the total command effort signal (u) that is provided to the VCM.

BRIEF DESCRIPTION OF THE DRAWINGS

The just summarized invention can be best understood with reference to the following description taken in view of the drawings of which:

FIG. 8 is a table representing the feed-forward durations for short to medium length seeks from as little as 1 track to as many as 160 tracks, that overall range being divided into five different sub-ranges;

FIG. 9 is a representative feed-forward table used for 1–2 track seeks;

FIGS. 12–14 are representative feed-forward tables used for 3–15 track seeks, 16–35 track seeks, and 36–80 track seeks (the longest table for seek lengths of 81–160 tracks is omitted for the sake of brevity);

DETAILED DESCRIPTION OF THE PREFERRED EMBODIMENT

Figure 1:
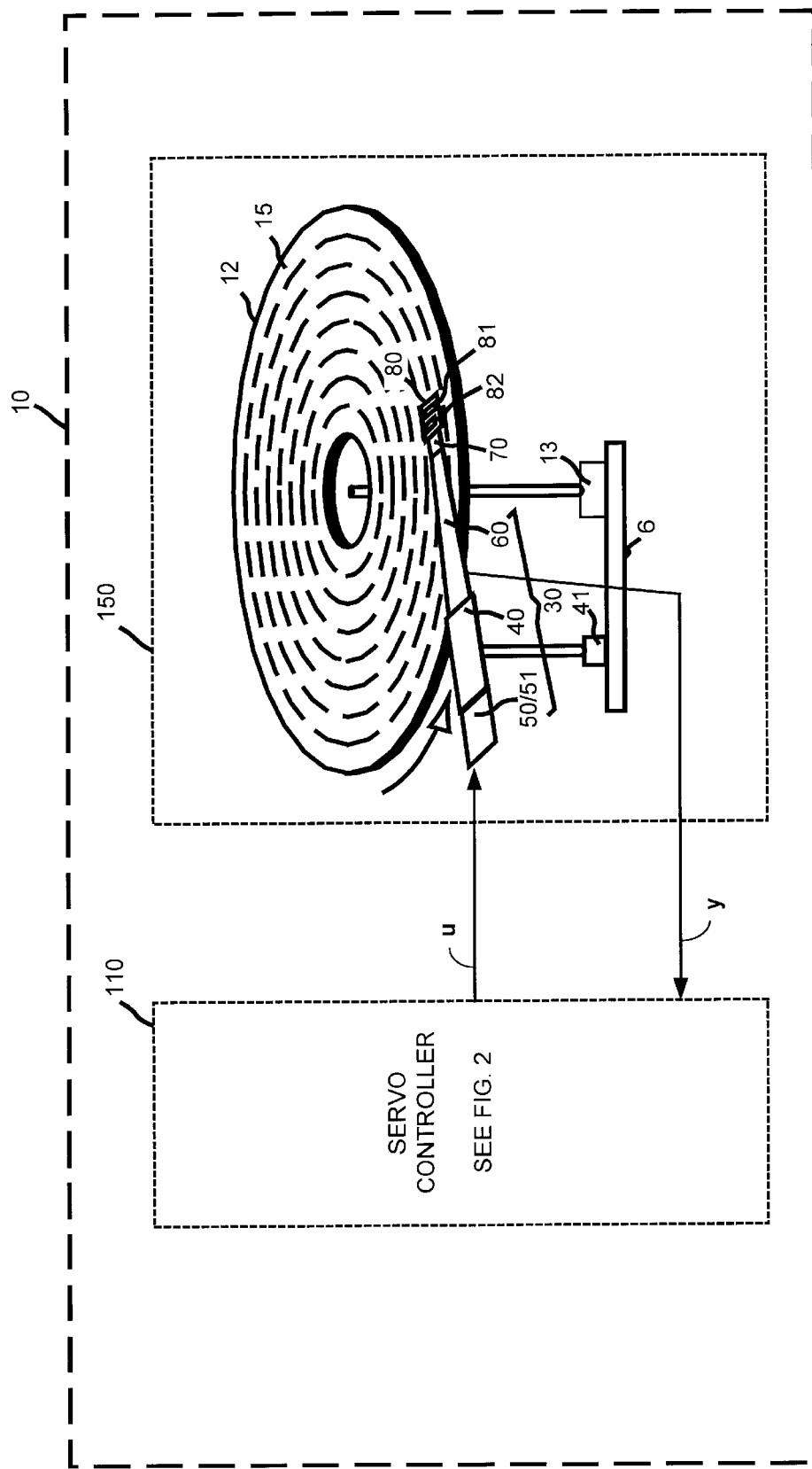
FIG. 1 is a block diagram of a disk drive having a servo controller and disk drive plant according to this invention, with emphasis on the components of the plant.
Figure 2:
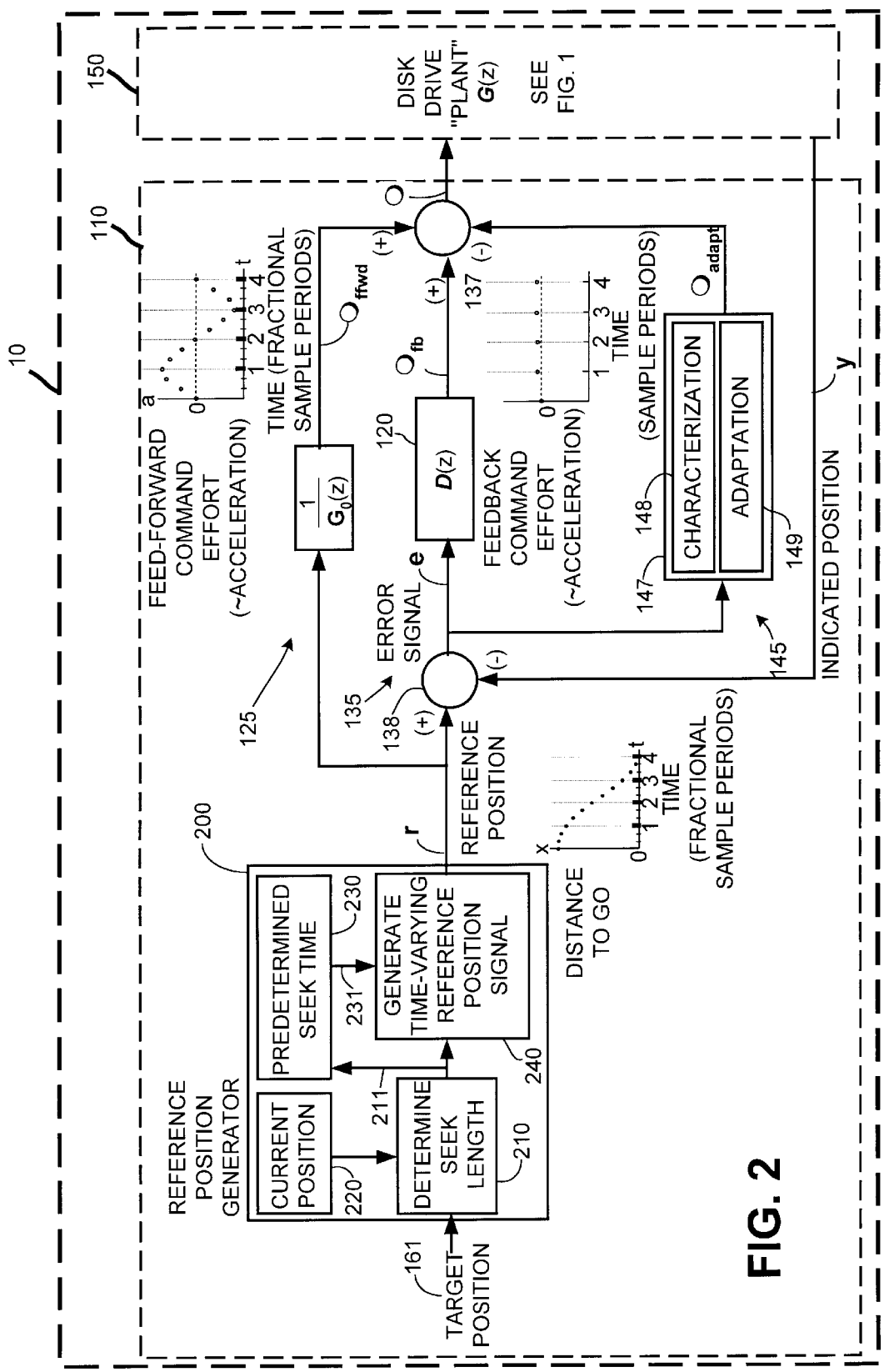
FIG. 2 is block diagram of the disk drive with emphasis on the components of the servo controller.

As shown in cooperative FIGS. 1 and 2, a disk drive 10 according to this invention generally comprises a servo controller 110 and a disk drive "plant" 150. FIG. 1 emphasizes the details of the plant 150 being controlled and FIG. 2 emphasizes the details of the servo controller 110 including a feed-forward control path 125, a feedback control path 135, and an adaptive control path 145.

A. The Preferred Embodiment—Generally

As shown in FIG. 1, the plant 150 generally comprises a base 6, a spindle motor 13 connected to the base 6, and a magnetic disk 12 connected to the spindle motor 6 (only one is shown, but there are generally two or more disks). The plant 150 also includes a swing-type actuator 30 consisting of a pivot body 40 that rotates on a pivot cartridge 41, a voice coil motor 50/51 (e.g. a coil 50 and permanent magnets 51) extending to one side of the pivot body 40, an actuator arm 60 extending from the other side of the pivot body 40, and a head gimbal assembly (HGA) 70 that includes a transducer 80. The particular transducer 80 shown includes separate read and write transducers 81, 82 as found in a magetoresistive head (MR head), but single transducer heads such as a conventional inductive head (not shown) may also be used.

The VCM 50/51 moves the transducer 80 in response to a total command effort u received from the servo controller 110 and the transducer 80 periodically samples servo position information recorded in servo tracks 15 on the disk 12 at a servo sampling rate to produce an indicated position signal y. The servo sampling rate is determined by the number of servo sectors per revolution and the rotational speed of the disk 12

FIG. 2 is a block diagram of the servo controller 110 that receives both a target position 161 and the indicated position signal y and then generates the total command effort u that is provided to the disk drive's VCM 50/51 for controllably seeking the transducer 80 to the target position 161. FIG. 2's various system blocks and signal lines include:

| | |
|---|---|
| G(Z) | actual frequency response of the plant 150 (VCM actuator and supporting structure) in the discrete-time domain |
| D(Z) | designed frequency response of the feedback compensator |
| G$_0$(Z) | modeled frequency response of the plant 150 in the discrete-time domain |
| A | an adaptive algorithm |
| r | reference position signal |
| y | indicated position signal |
| e | δ PES signal, the difference between the reference position r and the indicated position y |
| u | total command effort |
| U$_{ffwd}$ | feed-forward command effort |
| U$_{fb}$ | feedback command effort |
| U$_{adapt}$ | adaptive command effort |

In more detail, the servo controller 110 comprises a reference position generator 200 that receives a target position 161 (e.g. a particular location such as track 5,010) and thereafter provides the reference position signal r so that it varies as a function of time along a modeled position profile for moving the transducer 80 (see FIG. 1) from a start position to the target position in a controlled fashion.

The servo controller 110 generally comprises a feed-forward control path 125 that produces a feed-forward command effort $u_{ffwd}$, a feedback control path 135 that produces a feedback command effort $u_{fb}$, and an adaptive control path 145 that produces an adaptive command effort $u_{adapt}$. Ultimately, as shown in FIG. 2, a summing junction 137 combines the feed-forward command effort $u_{ffwd}$, the feedback command effort $u_{fb}$, and the adaptive command effort $u_{adapt}$ to form the total command effort u (voltage or current) that causes the VCM 50/51 to accelerate in one direction or the other.

In more detail, one sees that the reference position signal r is provided to both the feed-forward control path 125 and the feedback control path 135. The feed-forward control path 125, however, does most of the work. In particular, it receives the reference position signal r and produces a feed-forward command effort $u_{ffwd}$ to move the transducer 80 along the shaped position profile or, equally speaking, to move the transducer with a correspondingly shaped acceleration profile (e.g. a sinusoidal seek profile that improves settling time and reduces acoustic noise).

The preferred feed-forward control path 125 provides intersample, "multi-rate" control as discussed in the Multi-rate Feed-Forward Application discussed above, but a conventional "single-rate" feed-forward control path may be used as well. A multi-rate feed-forward control path 125 is preferred, however, because it more closely moves the transducer 80 along the shaped position profile than is otherwise possible during a short seek when relatively few servo samples are available. In particular, the feed-forward control path 125 outputs additional feed-forward command efforts $u_{ffwd}$ between servo samples in order to produce a closer piece-wise approximation to the desired profile. The preferred feed-forward rate is 4 times the servo sampling rate.

The feedback control path 135 is formed with the reference position signal r, the indicated position signal y, a combining junction 138 that differences these two signals to produce an error signal e, and a compensator 120 with a designed transfer function D(z) that produces a feedback command effort $u_{fb}$ at the servo sampling rate based on the error signal e. In operation along side the feed-forward control path 125, the feedback control path 135 repeatedly attempts, throughout the seek, to correct any error remaining in the indicated position signal y after the application of one or more prior feed-forward command efforts $u_{ffwd}$. If the feed-forward command efforts $u_{ffwd}$ are perfect, then the feedback control path 135 will not have to do any work. Due to virtually unavoidable deviations between the frequency response G$_0$(z) and the plant's actual frequency response G(z), however, it is likely that the feed-forward command efforts $u_{ffwd}$ will be imperfect such that transducer 80 overshoots or undershoots the target position, thereby requiring further feedback command effort $u_{fb}$ and detrimentally extending the overall seek time.

Figure 3A:
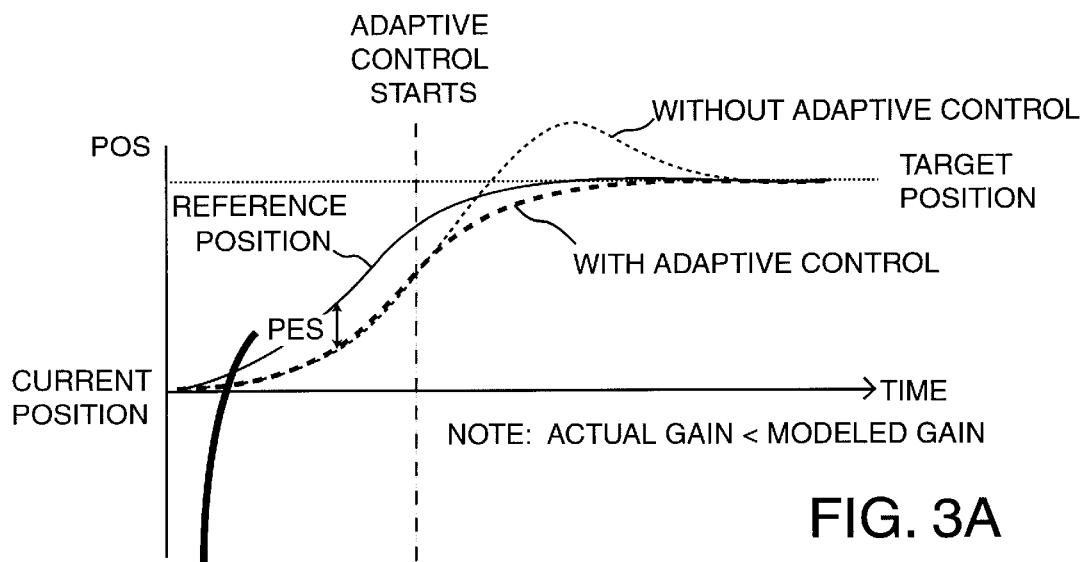
FIG. 3a is a graph of position versus time showing how the actuator position varies with and without adaptive control relative to a shaped reference position.
Figure 3B:
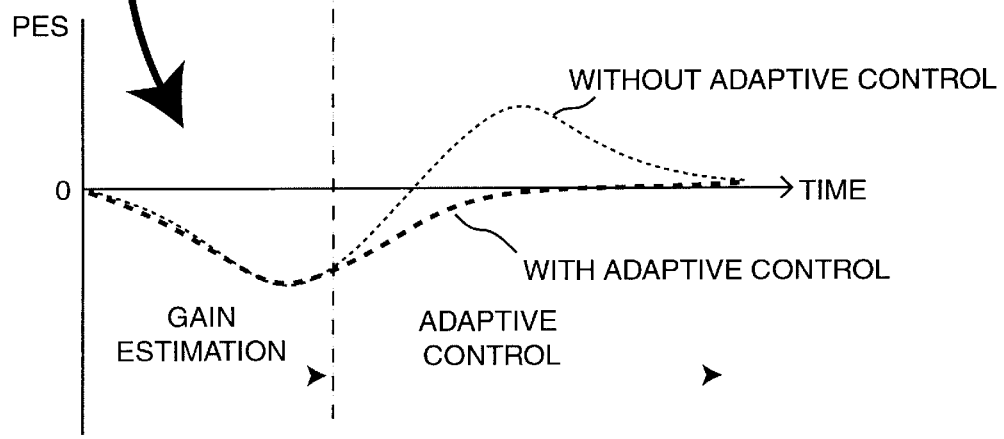
FIG. 3b is a graph of the error signal or PES versus time showing how the instantaneous error signal varies with and without adaptive control.

FIGS. 3a and 3b are graphs that show the affect of operating with and without adaptive control in a situation where the actual torque constant K$_T$ (gain) of the VCM 50/51 is less than the modeled torque constant K$_T$ (gain) of the VCM 50/51. FIG. 3a is a graph of position (POS) versus time. FIG. 3b is a graph of the position error signal e (aka PES) versus time, i.e. the difference between the reference position signal r and the indicated position signal Y (with or without adaptive control as the case may be).

As shown in FIGS. 3a and 3b, therefore, without adaptive control, the transducer's position (finely dashed line) lags the position one would expect were the model perfect. This lag occurs because the actual acceleration is less than the modeled acceleration. The result is an overshoot, an oscillating PES, additional acoustic noise, and a longer seek time.

The adaptive control path 145 is uniquely provided to minimize the effect of any "modeling error" deviation between the modeled frequency response G$_0$(z) and the plants actual frequency response G(z). The adaptive control path 145 is preferably implemented in firmware that figuratively provides an adaptive control block 147 that includes a characterization block 148 and an adaptation block 149. In particular, after the characterization block 148 "watches" how things are going for a little bit at the start of each seek, the adaptation block 149 kicks in for the remainder of the seek and produces an adaptive command effort $u_{adapt}$ that counteracts the effect of the modeling error. In other words, as discussed in even more detail further below, the adaptive control path 145 operates in two stages:

First, during an early portion of a seek, the characterization block 148 of the adaptive control path 145 monitors the error signal e in order to determine how well the feed-forward control path 125 is doing with regard to making the transducer follow the desired seek profile, i.e. in order to quantify any deviation due to modeling error between the plant's actual frequency response G(z) and the modeled frequency response G$_0$(z) assumed by the feed forward control path 125.

Second, during a later portion of the seek, based on the foregoing quantification, the adaptation block 149 of the adaptive control path 145 injects an adaptive command effort $u_{adapt}$ of suitable magnitude and sign in order to make the error signal e approach zero at the end of the seek profile, i.e. to make the transducer 80 stop where desired, at the target position, notwithstanding the error in the modeled frequency response G$_0$(z).

As also shown in FIGS. 3a and 3b, with adaptive control, the transducer's position (thick dashed line) initially lags the position one would expect were the model perfect during an initial "gain estimation" phase of the seek. When the adaptive control is applied, however, the modeling error that caused the initial deviation is accounted for and the transducer is guided toward the target position without overshooting. The beneficial result is no overshoot, no oscillating PES, reduced acoustic noise, and a shorter seek time.

B. The Preferred Embodiment—In More Detail

Figure 4:
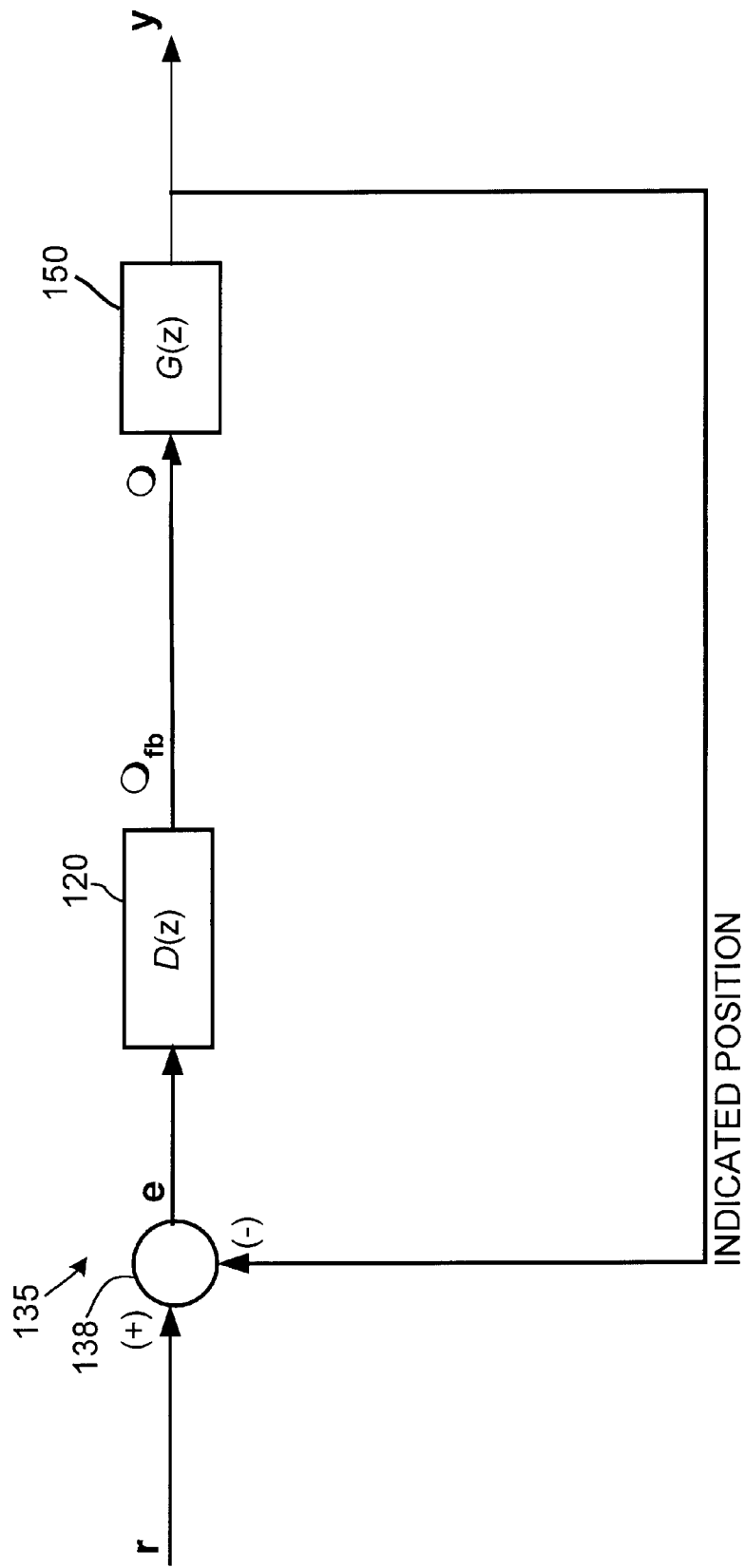
FIG. 4 is a block diagram of a feedback-only control system for a disk drive.
Figure 5:
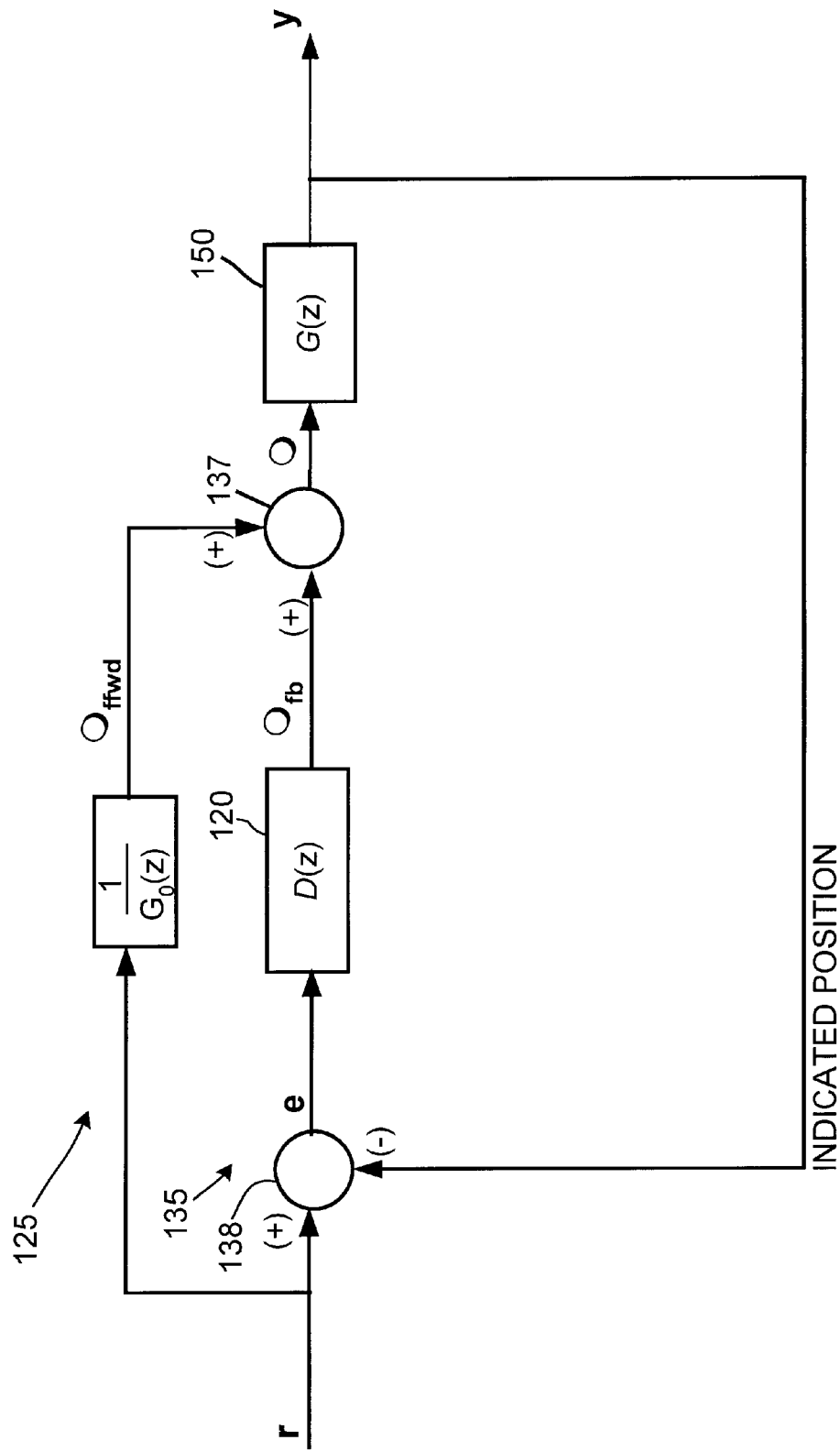
FIG. 5 is a block diagram of a feedback-constrained feed-forward control system for a disk drive.
Figure 6:
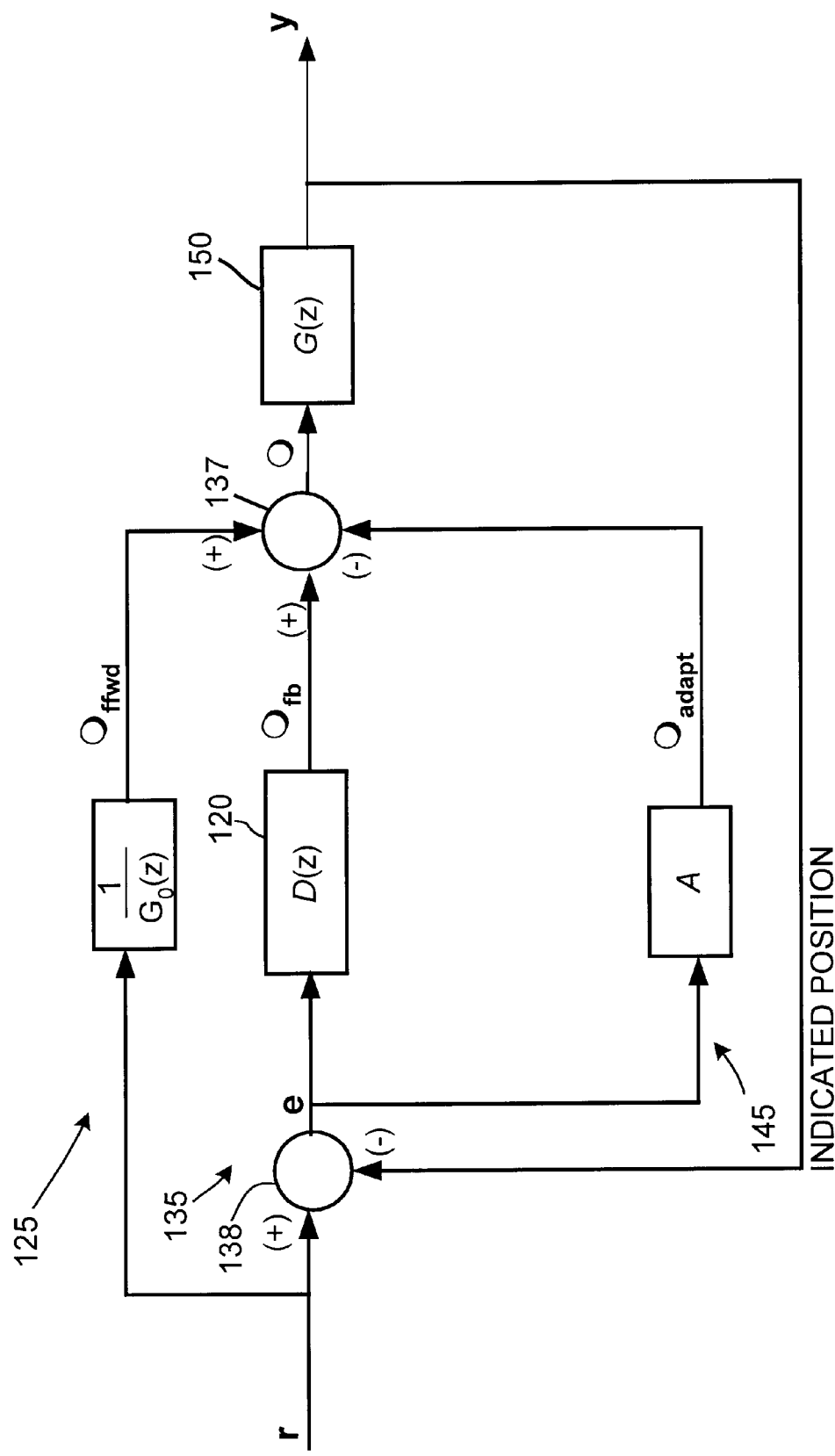
FIG. 6 is a block diagram of an adaptive feedback-constrained feed-forward control system for a disk drive according to this invention.

FIGS. 4, 5 and 6 are block diagrams of control systems. FIG. 6 is an amplified view of servo controller 110 and plant 150 of FIG. 2. In particular, for clarity's sake, FIG. 6 does not show any specific method for producing the position reference signal r or require a multi-rate feed-forward control path 125. FIGS. 4 and 5 show control systems that are contained within the FIG. 6 system and are discussed in progression to help better understand FIG. 6.

FIG. 4 shows the feedback loop 135 in isolation. Applying algebraic control system analysis, one can easily state the error signal e in terms of the position reference signal r as follows:

$$e = \left(\frac{1}{1+DG}\right)r \qquad (1)$$

As is well known, and assuming that the product DG is large, the error signal e will deviate from the position reference signal r according to the small, but nonzero value of the parenthetical quantity in equation (1), i.e.:

$$\left(\frac{1}{1+DG}\right) \qquad (2)$$

As a result, the product of the parenthetical quantity of equation (2) and the value of the position reference signal r represents the deviation between the desired position and the realized position due to the shortcomings of feedback control, a term that may be regarded as the feedback tracking error:

$$\left(\frac{r}{1+DG}\right) \qquad (3)$$

FIG. 5 shows the feed-forward control path 125 in combination with the feedback control path 135 of FIG. 4. In this case, algebraic control system analysis allows us to state the error signal e in terms of the position reference signal r as follows:

$$e = \left(1 - \frac{G}{G_0}\right)\left(\frac{1}{1+DG}\right)r \qquad (4)$$

Comparing the feed-forward/feedback equation (4) to the feedback-only equation (1), one can see that the following new term arises, a term that may be regarded as the "modeling error":

$$\left(1 - \frac{G}{G_0}\right) \qquad (5)$$

The equation (5) term is the relative modeling error between the modeled frequency response $G_0(z)$ within the feed-forward control path 125 and the actual frequency response G(z) of the plant 150 being controlled. Note, that if the modeled frequency response $G_0(z)$ exactly matched the actual frequency response G(z), then the modeling error of equation (5) would evaluate to zero and the overall error signal e specified in equation (4) would also be zero. As a practical matter, however, the modeled frequency response $G_0(z)$ will not equal the actual frequency response G(z) and the error signal e corresponding to the system of FIG. 5 will vary from the ideal.

FIG. 6, as already noted, is a block diagram of a disk drive including a control system 110 according to this invention, one that includes the unique adaptive feed-forward path 145. From the structure of the FIG. 6 system, we can algebraically derive the error signal e as follows:

$$e = \left(1 - \frac{G}{G_0}\right)\left(\frac{r}{1+DG}\right) + \left(\frac{G}{1+DG}\right)u_{adapt} \qquad (6)$$

Comparing equation (6) with equation (4), one easily sees the addition of a term that includes the adaptive command effort $u_{adapt}$ output by the adaptive control path 145. One may also notice that if the actuator's modeled response $G_0(z)$ of the feed-forward control path 125 perfectly matches the plant's actual frequency response G(z) such that the left hand terms evaluate to zero, the error signal e can be kept at zero by simply switching off the adaptive algorithm, i.e. by making $u_{adapt}=0$. However, such an ideal case does not often happen, and we need to design the reference position r, the compensator D(z), and the adaptive algorithm A in order to reduce the error signal e for the practical case.

In essence, we have the following two options to reduce the error signal e:

1. reduce the tracking error of equation (3), i.e. reduce $$\left(\frac{r}{1+DG}\right)$$

2. reduce the modeling error of equation (5), i.e. reduce $$\left(1 - \frac{G}{G_0}\right)$$

The available approaches for implementing the first option of reducing the tracking error of $$\left(\frac{r}{1+DG}\right)$$

are well known and need not be discussed in any detail herein. In essence, one must either reduce the amplitude of the error rejection curve $$\left(\frac{1}{1+DG}\right)$$

in the frequency band where the amplitude of the reference r is high or one must reduce the amplitude of the reference r in the frequency band where the amplitude of the error rejection curve is high.

The second option of reducing the modeling error $$\left(1 - \frac{G}{G_0}\right)$$

requires more accurate and more frequent calibration, and is ultimately limited by the variation of the plant's frequency response G(z). For a VCM 50/51, in fact, it is well knows that the torque constant $K_T$ varies with temperature and, at least as of today, such variance is not closely monitored. Therefore, several percent of $K_T$ gain error is likely. If the $K_T$ gain error is 10%, then the feedback adjusted feed-forward control of the system shown in FIG. 5 still gives 10% of the tracking error that would result from a feedback-only control loop like that shown in FIG. 4.

As shown in the preferred embodiment of FIG. 6, however, a control system 110 constructed In accordance with this invention includes an adaptive control path 145 that dynamically accounts for deviation between the modeled plant response $G_0$ and the actual plant response G. The presently preferred embodiment operates by assuming that the major contributor to such deviation is an actual torque constant $K_T$ that varies from the modeled torque constant $K_T$. The preferred approach to implementing an adaptive algorithm A is set forth in the following section.

C. The Adaptive Algorithm

The goal in designing the adaptive algorithm A is to produce an adaptive command effort $u_{adapt}$ that reduce the error signal e in equation (6).

Ideally, of course, we would design an algorithm A that produced an adaptive feed-forward command effort $u_{adapt}$ that completely eliminated the error signal e, i.e. by setting equation (6) equal to zero and solving for $u_{adapt}$ as follows:

$$u_{adapt} = \left(1 - \frac{G}{G_0}\right)\left(\frac{r}{1+DG}\right) * \left(\frac{1+DG}{G}\right) \quad (7)$$

$$= \left(\frac{1}{G_0} - \frac{1}{G}\right)r$$

Implementing equation (7) is not practical, however, since it requires advance knowledge of the plant's actual frequency response G. In accordance with the preferred embodiment of this invention, however, we can estimate the plant's actual frequency response G by observing the transducer 80 during the beginning of the seek (especially during the feed-forward), and generate an adaptive command effort $u_{adapt}$ that, while it does not eliminate, does reduce the error signal e.

First, in order to implement our preferred estimate of the plant's actual frequency response G, we assume that the relative modeling error during each seek is a frequency independent gain constant within a major frequency band of the reference position signal r, i.e. we assume that:

$$\left(1 - \frac{G}{G_0}\right)r \approx d * r \quad (8)$$

This assumption is reasonably accurate, of course, where the modeling error is due in whole or in large part to variations in the VCM's torque constant $K_T$ as we have already proposed. The quantity $$d = \left(1 - \frac{G}{G_0}\right)$$

is a frequency independent gain that is aptly called the "gain error." Note that we can make sure this assumption holds approximately true because we can shape and smooth r in the primary feed-forward control path 125 in order to reduce its high frequency components.

With this background, it should now be clear that the adaptive algorithm A preferably consists of two steps: First, we observe e and estimate d (the gain error) during the beginning of the seek and second we generate the adaptive feed-forward command effort $u_{adapt}$ for use during the remainder of the seek.

1. Estimation of d

The estimation of d is done during the early command efforts of the primary feed-forward control path 125, during which time the error signal e either undershoots or overshoots relative to the ideal position reference r depending on the direction of the gain error. When the actual $K_T$ associated with the actual plant response G is smaller than that assumed in the model $G_0$, the feed-forward command effort $u_{ffwd}$ is insufficient such that the transducer position lags the position reference r and the error signal e (or PES) undershoots (see e.g. FIGS. 3a and 3b).

By way of example, in the case of a −10% gain error as evident in a 1-track seek that is expected to take place over a span of sixteen (n=16) servo samples, it has been observed that an undershoot of 1.54% occurs. For a 100-track seek, a 1.54% undershoot translates into 1.54 tracks which is far beyond the normal position error caused by other disturbances and noise. The system will have sufficient signal to noise ratio to detect overshoot or undershoot that may be attributed to the gain error.

In view of this observation, a simple way to estimate the gain error is to integrate the error signal e during the first m samples while the transducer is responding to the command efforts of the primary feed-forward control path 125, i.e.

$$S_m = \sum_{i=1}^{m} e[i] \quad (9)$$

where m<n is a parameter to be selected. A large m (before e changes sign) gives better signal to noise ratio but also delays the adaptive command effort that will ultimately hurt settling. The value of m can be set on the basis of experimental data.

Let $S_{m0}$ be the integrated position error for the feedback-only control path 135 with the position reference r, then the gain error amount d is readily calculated as:

$$d = \frac{S_m}{S_{0m}} \quad (10)$$

2. Generation of the Adaptive Command Effort $u_{adapt}$

Once our estimate of d is calculated as stated above, we can begin to output the adaptive command effort $u_{adapt}$ starting from sample m or sample m+1, depending on the amount of algorithm delay. The calculation of the adaptive command effort $u_{adapt}$ is similar to Equation (7) with the estimated d substituted for $$\left(1 - \frac{G}{G_0}\right)$$

in the left-hand term and with $G_0$ substituted for G in the right-hand term based on the assumption that $G_0$ is about 90% accurate.:

$$u_{adapt} = \left\{ d\left(\frac{r}{1+DG}\right)\right\}_{m+} * \left\{\left(\frac{1+DG_0}{G_0}\right)\right\} \quad (11)$$

and with the only difference being that Equation (11) needs to be interpreted in the time-domain instead of the frequency-domain, i.e.

$$\left\{ d\left(\frac{r}{1+DG}\right)\right\}_{m+} :$$

position error trajectory starting from sample m $$\left\{\left(\frac{1+DG_0}{G_0}\right)\right\} :$$

the inverse impulse response of the torque rejection curve.

In plain words, the adaptive command effort $u_{adapt}$ is selected to cancel the relative position error e from sample m. Due to the delay (or lag) in the plant model $G_0$ in the feed-forward control path 125, however, $$\left\{\left(\frac{1+DG_0}{G_0}\right)\right\}$$

could be infinite (or at least huge) which means that an infinite (or huge) $u_{adapt}$ is needed. This will either be impossible or will excite a resonance and is not desired. Therefore, an approximate cancellation of e is preferred. The following optimization problem is solved to perform such approximation:

$$\min_{u_{adapt}} \left\{ \left\| \left\{ d\left(\frac{r}{1+DG}\right)\right\}_{m+} - \left\{\frac{G_0}{1+DG_0}\right\} * u_{adapt0} \right\|^2 + \alpha \left\| \frac{d}{dt} u_{adapt} \right\|^2 \right\} \quad (12)$$

where α is a design parameter to control the smoothness of the normalized adaptive command effort $u_{adapt0}$. A larger α leads to a smoother $u_{adapt0}$ but large residue position error, i.e. less cancellation of e.

The normalized adaptive command effort $u_{adapt0}$ only needs to have finite length that is enough to cancel the error smoothly. A straight forward choice is to apply $u_{adapt0}$ from sample m (when the gain error is estimated) until sample n (when feed-forward ends and settling starts).

Figure 7:
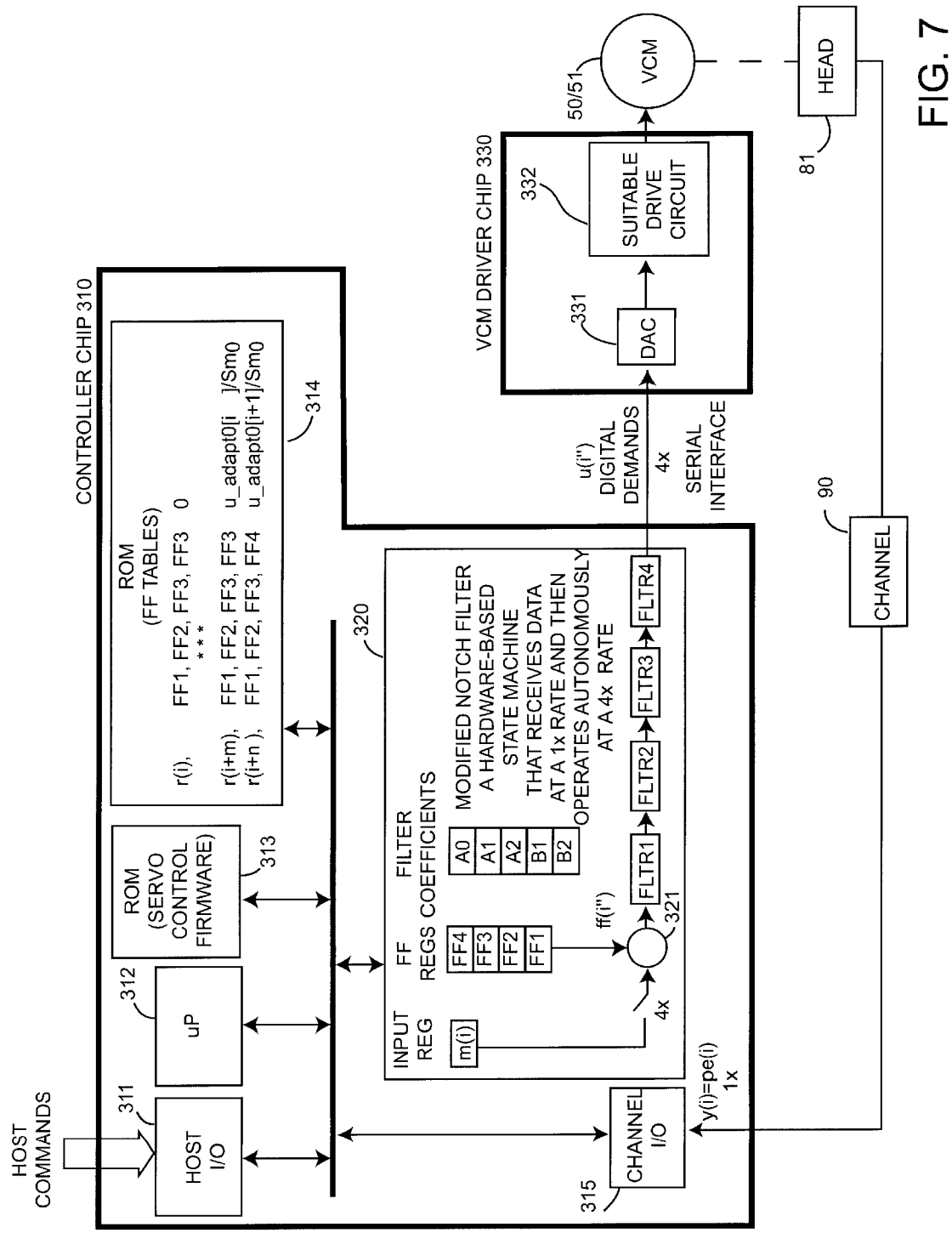
FIG. 7 is a block diagram of a representative control loop embodiment wherein the reference position signal r(i) for each sample period and the related feed-forward values FF1, FF2, FF3, and FF4 (four in this embodiment) are stored in suitable tables and provided to a suitable hardware-based state machine 220 for output as multi-rate digital demands u(i") at a 4× rate.

FIG. 7 is a block diagram of a representative control loop that is less abstract than that shown in FIGS. 1 and 2. Here, the control loop comprises a controller chip 310, a VCM driver chip 330, the VCM 50/51, the head 80, and a read channel 90. In this particular embodiment, the functional equivalent of the servo controller 110 of FIGS. 1 and 2 is implemented by suitable portions of the controller chip 310 and the VCM driver chip 330.

As suggested by FIG. 7, suitable firmware tables are used to store a plurality "n" of reference position signals r(i) during which feed-forward will be implemented, the related feed-forward values FF1, FF2, FF3, and FF4 (four in this embodiment) for each reference position r(i), and adaptation quotients $u\_adapt_0[i]/S_{m0}$ that are zero during an initial "m" learning samples and are non-zero during a remaining n-m adaptation samples. In this particular embodiment, a succession of input value m(i) and the four feed-forward values are provided at a 1× rate to a state machine 220 for output as multi-rate digital demands u(i"). These tables are discussed in more detail below.

The controller chip 310 includes a microprocessor 312 for executing servo and non-servo programs. The microprocessor, for example, executes a servo control algorithm stored in a read-only memory (ROM) 313. The controller chip 310 receives host commands from a host (not shown) via a host I/O block 311 and receives an indicated position signal pe(i) from the channel 90 via a channel I/O block 315.

The controller chip 310 would ordinarily develop a total command effort based on the difference m(i) between the target position and the indicated position signal 151. Here, however, the controller chip 310 uniquely includes a table ROM 314 and a multi-rate state machine 320 that, concurrent with the execution of non-servo programs by the microprocessor 312, autonomously applies a feed-forward command effort signal at a feed-forward rate that is greater than the servo sampling rate to move the transducer more closely along the shaped position profile between servo samples. The preferred state machine 320 also implements, as suggested by FIG. 7, a notch filter function that dampens mechanical resonances while outputting multi-rate demands u(i") based on the feed-forward values stored in the table ROM 314. In particular, after a servo wedge has been read and an indicated position 151 has been returned by the channel 90, the servo control firmware, which is running on the microprocessor 312, accesses the appropriate data in the table ROM 314, calculates a modified demand value m(i) by subtracting the indicated position 151 from a suitably scaled version of the reference position signal r(i), and then loads the demand value m(i) (ideally zero) and the feed-forward values FF1, FF2, FF3, FF4 into corresponding registers in the state machine 320. The state machine 320 thereafter process these values at a 4× rate in order to output four successive digital demands u(i") at a 4× rate based on the modified demand value m(k) and the feed-forward values FF1, FF2, FF3, FF4.

The preferred state machine is a notch filter implemented as a second order digital filter that operates according to this equation:

$$u(k") = A_0 n(k") + A_1 n(k"-1) - B_1 u(k"-1) - B_2 u(k"-2)$$

where n(k") is the input to the filter, u(k") is the output of the filter, and $A_0$, $A_1$, $A_2$, $B_1$ and $B_2$ are constant coefficients that determine the behavior of the filter.

The overall filter uses a chain of four filters FLTR1, FLTR2, FLTR3, FLTR4. In operation, the state machine 320 is oversampled at a 4× rate (as compared with the servo sample rate) and the first filter FLTR1 is provided with a combination of the feedback-computed demand value m(k) and the following sequence of four inputs $n_1(k)$ as suggested by the combining junction 321 of FIG. 7:

$$n_1(k") = m(k") + FF1$$

$$n_1(k"+1) = m(k") + FF2$$

$$n_1(k"+2) = m(k") + FF3$$

$$n_1(k"+3) = m(k") + FF4$$

The output of each filter feeds the input of the next such that:

$$n_2(k") = u_1(k")$$

$$n_3(k") = u_2(k")$$

$$n_4(k") = u_3(k")$$

The VCM driver chip 330 contain a DAC 331 that receives the digital demands u(i") from the state machine 320 and converts them to an analog value (typically a voltage) that is further provided to a suitable drive circuit 332 that drives the VCM 50/51 (typically with current).

FIG. 8 is a table selection table representing the feed-forward durations for short to medium length seeks from as little as 1 track to as many as 160 tracks. The overall range of tracks from 1 to 160 is divided into five different sub-ranges that have difference feed-forward durations ranging from 6 to 28 samples k.

FIG. 9 is a representative feed-forward table used for 1–2 track seeks, the first column representing the sample i (servo wedge), the second column containing the reference position signal r(i), the third through sixth columns containing the feed-forward values that are used to output 4× demands u(i") between 1× servo samples, and the seventh column containing an adaptation factor that was previously derived from the $S_{m0}$ and u_adapt$_0$[i] values of one or more sample drives.

Figure 10:
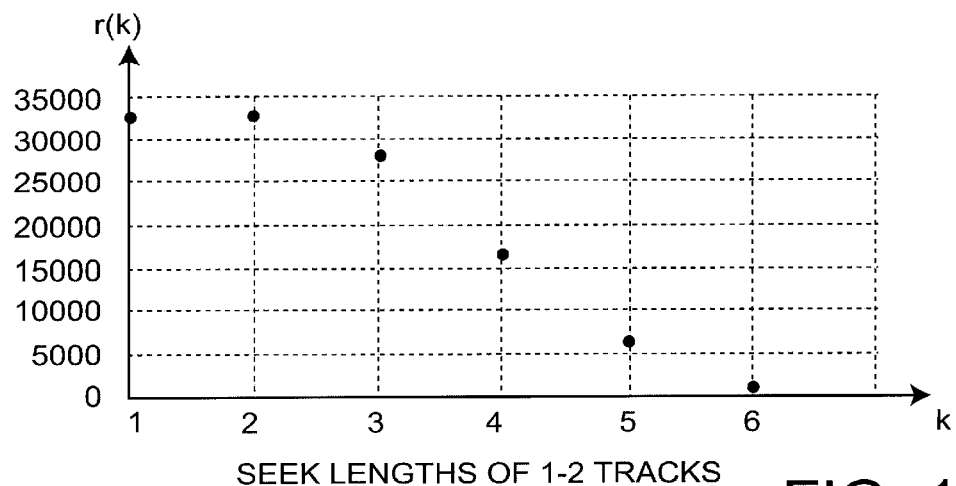
FIG. 10 is a plot of the reference position signal r(i) from the 1–2 track seek table of FIG. 9.

FIG. 10 is a plot of the reference position signal r(i) from the 1–2 track seek table of FIG. 9. The values for the reference position signal r(i) provide maximum resolution given a 16-bit two's complement representation and are normalized to a one track seek. The reference position signal r(i) is used without modification, therefore, for a 1 track seek and is scaled by a factor of 2 for a 2 track seek. The other tables are similarly normalized to a one track seek such that the values of the reference position signal r(i) are conveniently scaled in a like manner.

Figure 11:
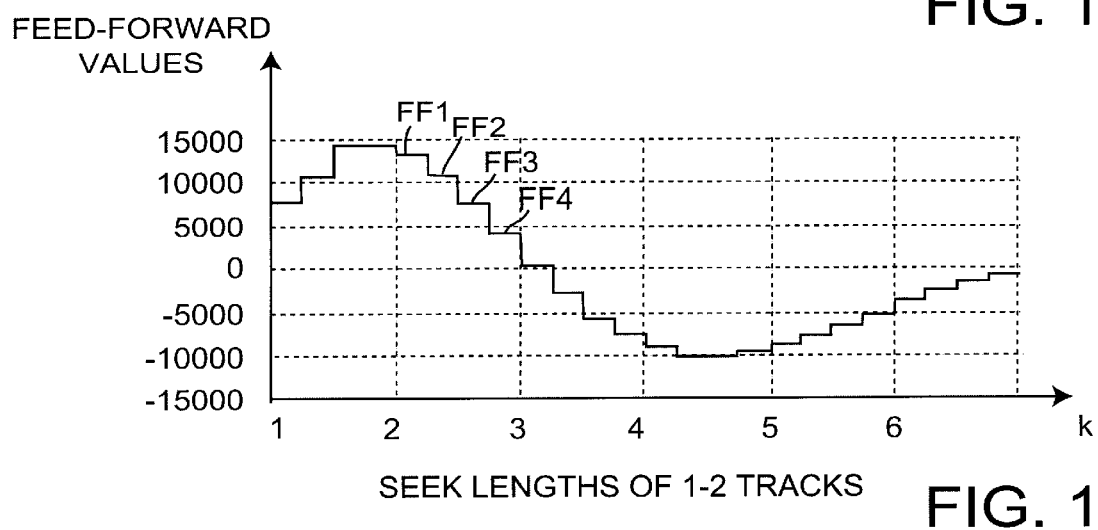
FIG. 11 is a plot of the feed-forward values from the 1–2 track seek table of FIG. 9.

FIG. 11 is a plot of the feed-forward values from the 1–2 track seek table of FIG. 9. The four feed-forward values FF1, FF2, FF3, FF4 that are associated with the second sample period (i=2) are also identified on the graph. The feed-forward values are also normalized to a one-track situation so that they are easily scaled for seeks of various length seeks. Note that in this actual case, the acceleration profile represented by FIG. 11 is a modified sinusoid that has been found to provide better performance than a true sinusoid.

FIGS. 12–14 are representative feed-forward tables used for 3–15 track seeks, 16–35 track seeks, and 36–80 track seeks. The longest table for seek lengths of 81–160 tracks has been omitted, but it is structurally the same as the others. Note that in the right-most column of these tables, the first m entries are zero-valued whereas the remaining m-n values are non-zero. This correlates to the fact that the adaptive control path will "learn" without adaptation during the first m samples and then actively adapt, based on what was learned, during the final m-n samples.

Figure 15:
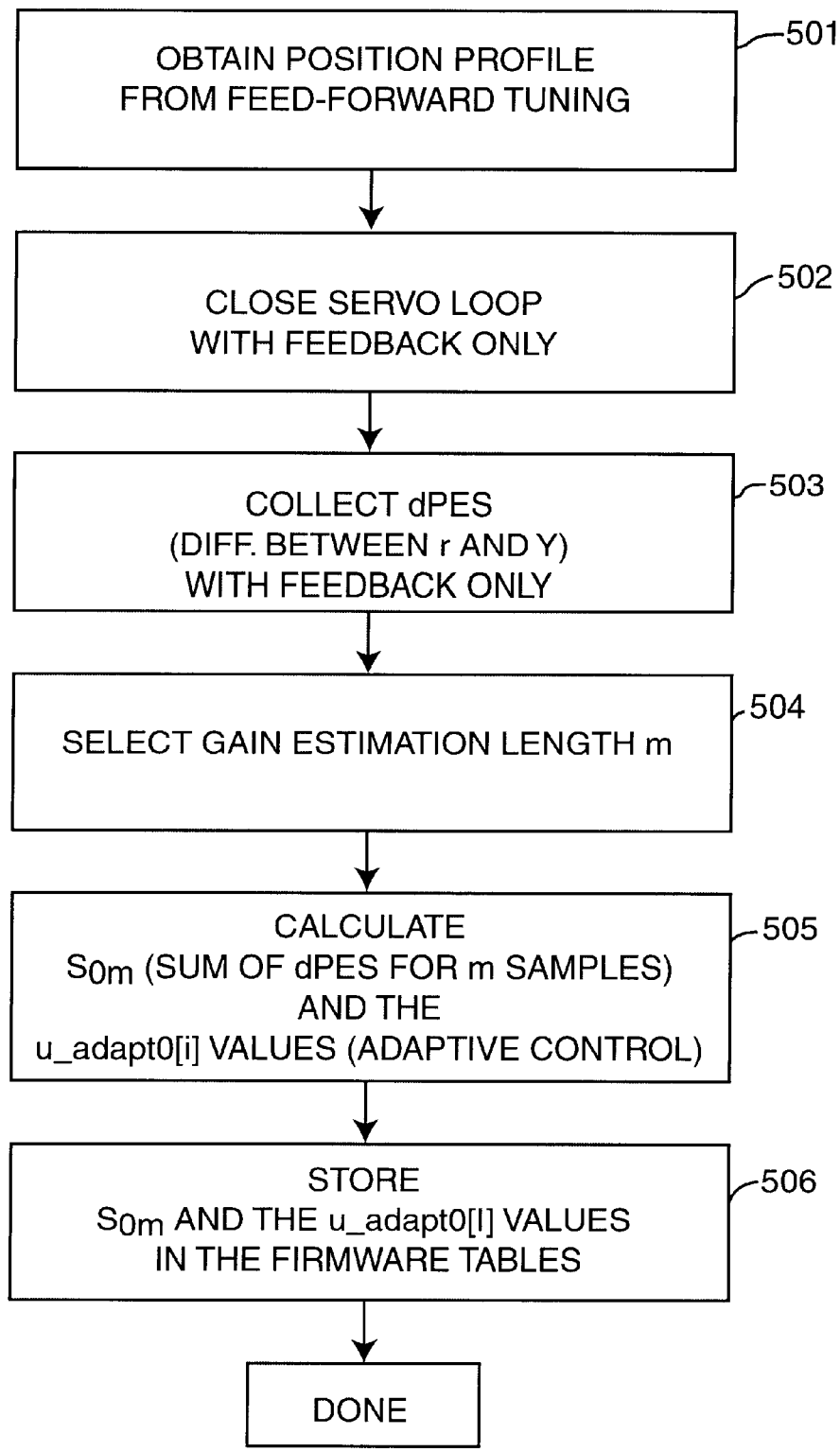
FIG. 15 is a flow chart illustrating a preferred method of tuning the adaptive control path 145 for a group of drives based on empirical data collected from one or more sample drives to select a suitable gain estimation or "LEARN" length "m", to establish a baseline accumulation of δ pes values (δ pes=r−y with feedback only) into an accumulation variable $S_{m0}$, and to establish a plurality of u_adapt$_0$[I] values for use in adapting later seeks based on a ratiometric relationship between an actually observed accumulation of δ pes values $S_m$ and the baseline value $S_{m0}$.

FIG. 15 illustrates a preferred method of tuning the adaptive control path 145 by establishing a suitable number m of sample periods for learning and then establishing $Sm_0$ and several u_adapt[i]$_0$ for use in later seeks. As indicated on the tables themselves, these two values are ultimately stored together as the quotient $Sm_0$/u_adapt[i]$_0$.

The tuning takes by measuring the error signal from a representative number of disk drive during several seeks. The error signals are averaged together for sample 1, sample 2, and so on, and then the sum of the m average values is established to create a baseline error sum $Sm_0$ for use in desablishgin the amount and direction of gain error d in a particular drive. The tuning method takes place as follows.

At step 501, the controller obtains the shaped position profile to be used with a feed-forward seek that is accomplished in "n" samples.

At step 502, the controller closes the servo loop and operates with feedback only.

At step 503, the controller 0collects the δ pes values, which is not the same as the indicated position y or the error signal e, but rather a measure of how the drive does not follow the reference position signal r(i) due to gain errors, i.e. the cumulative sum of the error signal e representing the difference between the reference position signal r and the indicated position signal y. The δ pes values will follow an oscillatory pattern, of course, starting at zero, peaking to one side, crossing over zero, peaking to the other side, returning to zero, and soon.

At step 504, the "Gain Estimation Length" or learning period "m" is empirically selected in units of samples. At present, this is accomplished by visually locating M somewhere between the initial error peak and the zero crossing (not shown), while subjectively comprising the fact that a larger m beneficially provides a better signal-to-noise ratio and gives more accurate information to use for adaptive correction while detrimentally delaying the application of the adaptive control effort u_adapt during which time the actuator is diverging from the desired profile and during which time the necessary correction may grow too large to handle in the time remaining.

At step 505, the values of Sm0 (the sum of δ pes for all "m" samples) and the u_adapt0[I] values are calculated with suitable numeric analysis;

At step 506, the Sm0 and the u_adapt0[I] values are stored in the code for later use, i.e. in the firmware tables along with the reference position signal r(i) and the feed-forward values FF1, FF2, FF3, FF4.

Figure 16:
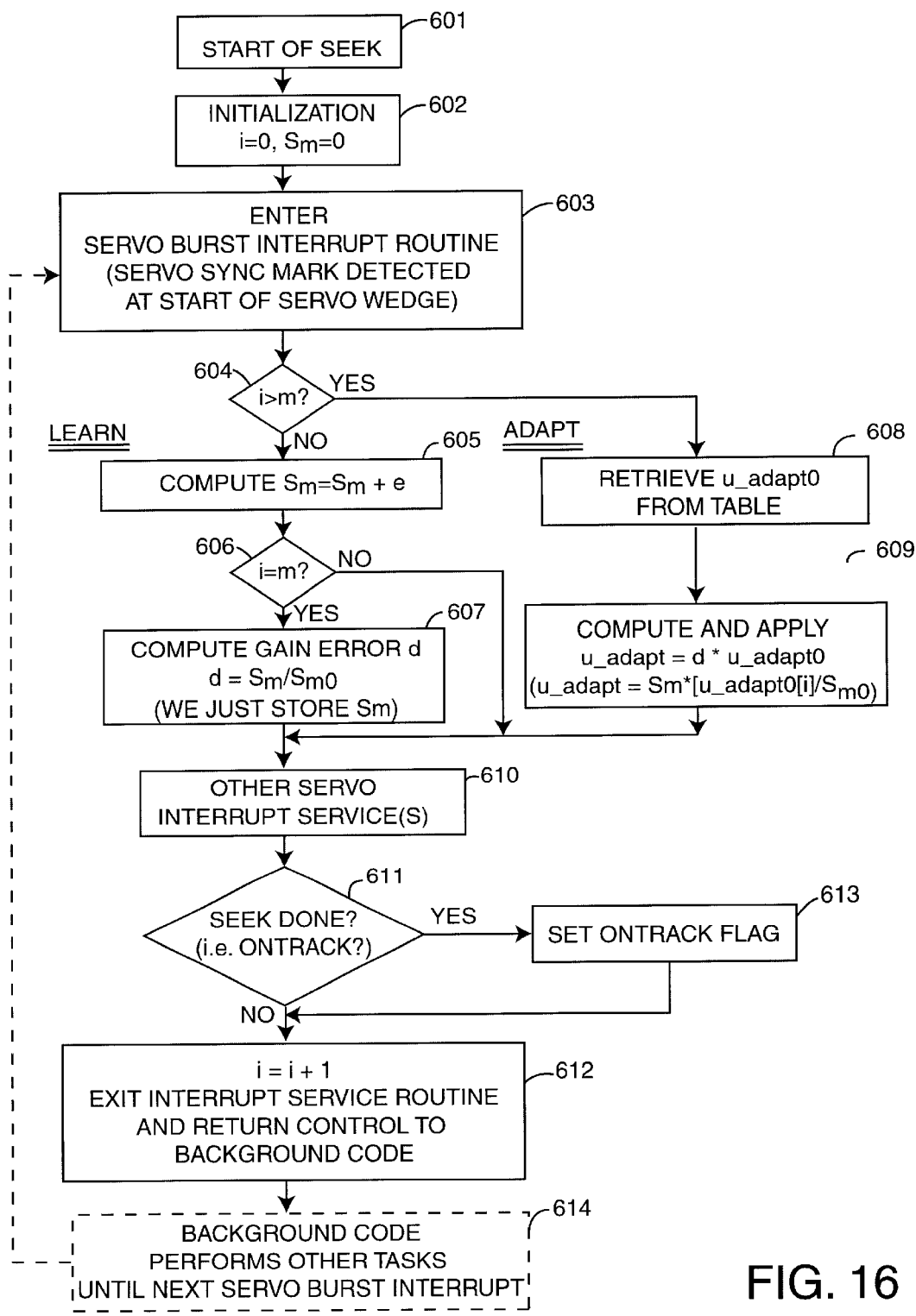
FIG. 16 is a flow chart illustrating how the preferred servo controller 110, implemented as shown in FIG. 7, implements a seek according to a preferred embodiment of the invention.

FIG. 16 illustrates how the preferred servo controller 110 implements a seek according to a preferred embodiment of the invention where the adaptive control path 145 will initially observe the error signals (e) (from i=0 to i=m) and then output an adaptive command effort uadapt (from i>m to end of seek). In more detail, the flow chart correspond to an order wherein the adaptive control path 145 first conducts a "LEARN" phase where the system observes the reference position signals r and errors signals e to accumulate δ pes values (δ pes=r−y without feedback) into an accumulation variable $S_m$ during an initial m samples (recall the Characterization Block of FIG. 2) and then conducts an "ADAPT" phase where the adaptive control path applies the learned value $S_m$ to the stored values $S_{m0}$, and u_adapt$_0$ to calculate a suitable u_adapt value based on the learned value $S_m$;

At step 601, the controller begin to process a seek required by a host command;

At step 602, the controller resets two variables i and Sm for use during the implementation of the requested seek. The first variable i is used as an internal counter and the second variable Sm is used to accumulate error signals e.

Step 603 represents that occurs of a servo burst interrupt, i.e. the detection of a servo synch mark at the start of a servo wedge.

At step 604, the controller check whether i>m.

At step 605, if step 603 resolves to "No" (i<m), the controller accumulates the current error signal e into Sm by adding the error signal e to the former value of Sm and storing the sum in Sm.

At step 606, the controller checks if i=m.

At step 610, if step 607 resolves to "No" (i.e. i<m), the controller responds to any other servo interrupt service.

At step 611, the controller checks to see if "Seek done?", i.e. whether or not a read ontrack or write ontrack condition exists.

At step 612, if step 610 resolves to "No" (seek not yet done), the controller increments i and then exits the interrupt service routine so that the processor, at step 614, may handle other non-servo tasks until it receives another servo burst interrupt indicating the start of another servo wedge.

The controller then repeats steps 603, 604, 605, 606, 610, 611, 612, and 614 until step 606 resolves to "Yes" (i=m).

At step 607, if step 606 resolves to "Yes" (i=m), the controller computes the gain error d by dividing Sm, just accumulated, with Sm0 as provided in equation (10) above.

At step 608, if step 604 resolves to "Yes" (i>m) such that Sm is now in hand, the controller retrieves the normalized adaptive command effort uadapt0[I]/Smo from the appropriate table.

Finally, at step 609 the controller computes the adaptive command effort uadapt that is appropriate by multiplying the u_adapt0[I] by the gain error d or, equivalently, by multiplying Sm by Sm0/u_adapt0[I] as the latter two value are actually stored.

At step 613, after step 611 has ultimately determined that an ontrack condition exists, an ontrack flag is set.

We claim:

1. A disk drive comprising:
   (1) a plant having an actual frequency response (G), the plant including a transducer that repetitively samples position information during sample periods to produce a signal representing an indicated position (y), and a voice coil motor (VCM) adapted for positioning the transducer in response to a total command effort signal (u), and
   (2) a servo controller for generating the total command effort signal (u) for moving the transducer from a start position to a target position, the servo controller comprising:
      (a) a reference position generator that produces a reference position signal (r) that varies as a function of time and represents a shaped position profile to be followed by the transducer as it moves from the start position to the target position;
      (b) a feed-forward control path that operates according to a modeled frequency response ($G_0$) of the plant, the feed-forward control path receiving the reference position signal (r) and producing a feed-forward command effort signal ($u_{ffwd}$) that corresponds to moving the transducer along the shaped position profile when the actual frequency response (G) is equal to the modeled frequency response ($G_0$);
      (c) a feedback control path including a difference junction that differences the reference position signal (r) and the indicated position signal (y) to produce an error signal (e) when the transducer does not move along the shaped position profile due to a deviation between the actual frequency response (G) and the modeled frequency response ($G_0$), the feedback loop producing a feedback command effort signal ($u_{fb}$) based on the error signal (e);
      (d) an adaptive control path that
         (i) receives the error signal (e) over a plurality of initial sample periods to characterize the deviation between the actual frequency response (G) and the modeled frequency response ($G_0$),
         (ii) and then produces an adaptive command effort signal ($u_{adapt}$) based on the characterized deviation to cause the transducer to more closely follows the shaped position profile as it continues to the target position; and
      (e) a summing junction that combines the feed-forward command effort signal ($u_{ffwd}$), the feedback command effort signal ($u_{fb}$), and the adaptive command effort signal ($u_{adapt}$) to produce the total command effort signal (u) that is provided to the VCM.

2. The disk drive of claim 1 wherein the transducer periodically samples position information at a servo sampling rate, wherein the feedback loop produces the feedback command effort signal ($u_{fb}$) at the servo sampling rate, and wherein the feed-forward control path produces the feed-forward command effort signal ($u_{ffwd}$) at a feed-forward rate that is greater than the servo sampling rate to move the transducer in closer stepped approximation to the shaped position profile than is possible by only producing the feed-forward command effort signal ($u_{ffwd}$) at the servo sampling rate.

\* \* \* \* \*